Oct. 14, 1969     E. FTHENAKIS     3,472,468
ATTITUDE STABILIZER FOR SPACE VEHICLES
Filed Oct. 28, 1959     7 Sheets-Sheet 1

INVENTOR.
EMANUEL FTHENAKIS
BY
Edward W. Hughes
ATTORNEY

Oct. 14, 1969     E. FTHENAKIS     3,472,468
ATTITUDE STABILIZER FOR SPACE VEHICLES
Filed Oct. 28, 1959     7 Sheets-Sheet 2
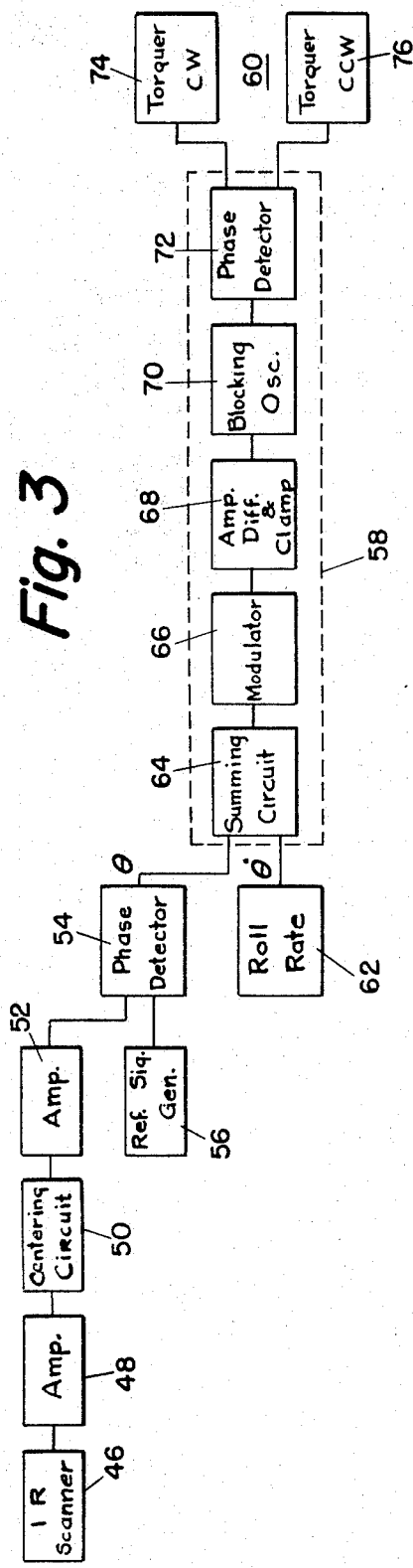
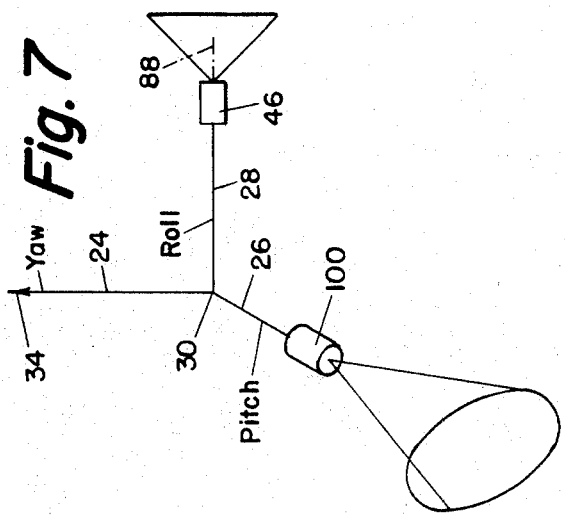
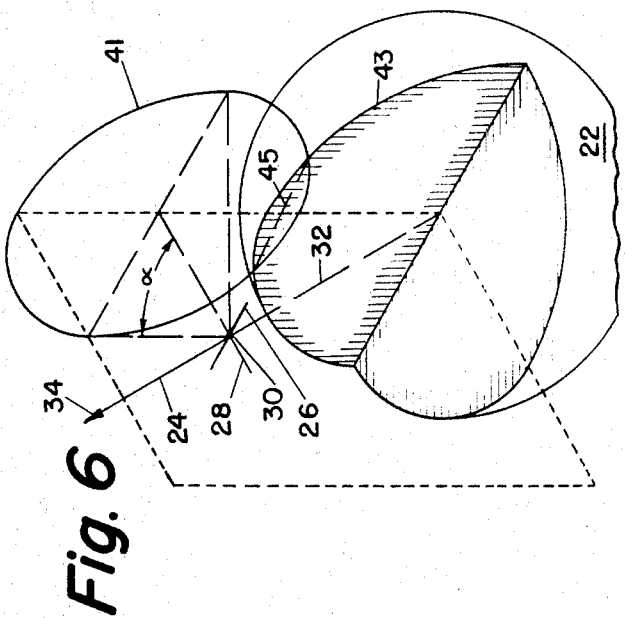
INVENTOR.
EMANUEL FTHENAKIS
BY
Edward W Hughes
ATTORNEY INVENTOR.
EMANUEL FTHENAKIS
BY
Edward W. Hughes
ATTORNEY

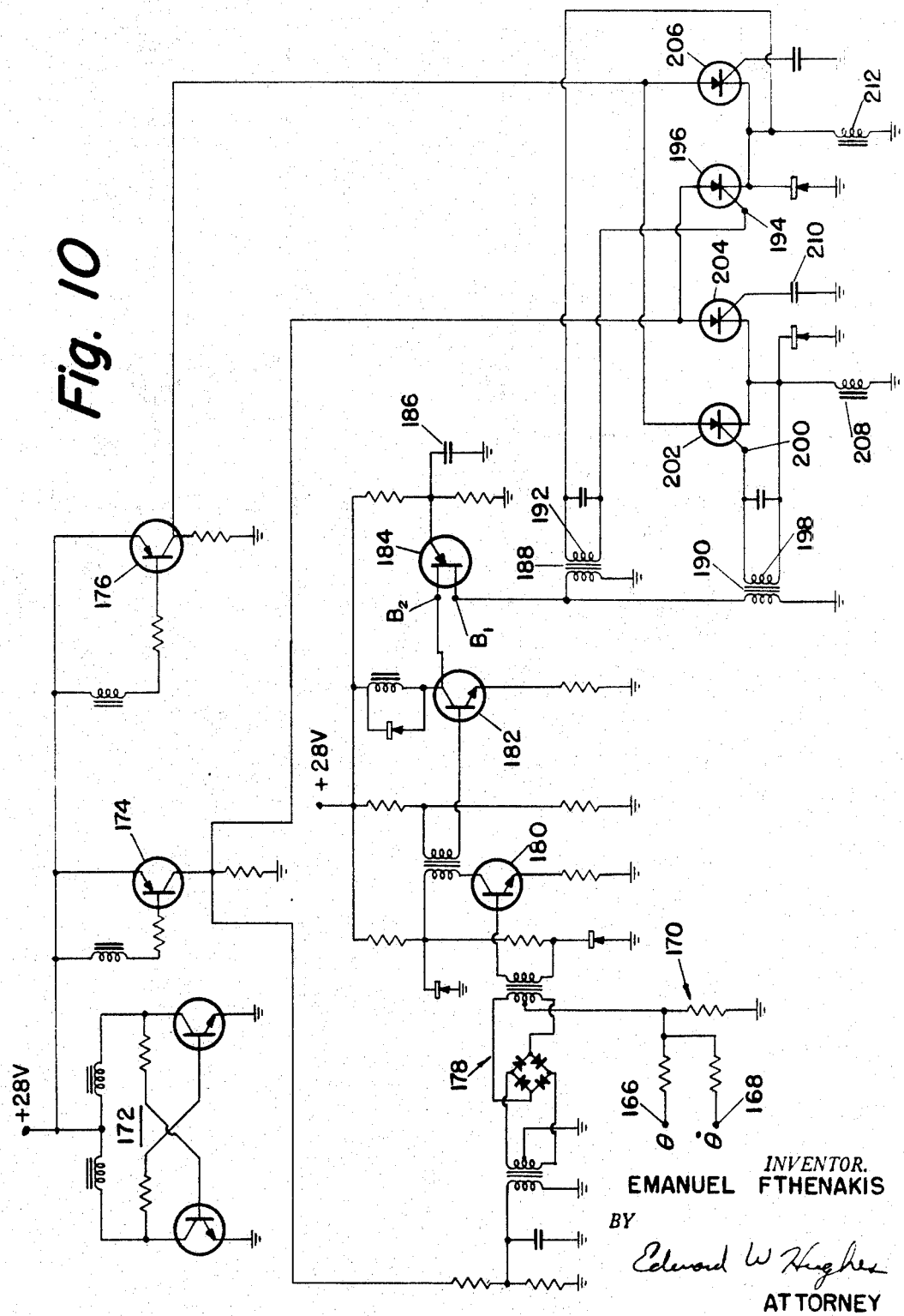

Oct. 14, 1969       E. FTHENAKIS       3,472,468
ATTITUDE STABILIZER FOR SPACE VEHICLES
Filed Oct. 28, 1959                    7 Sheets-Sheet 7
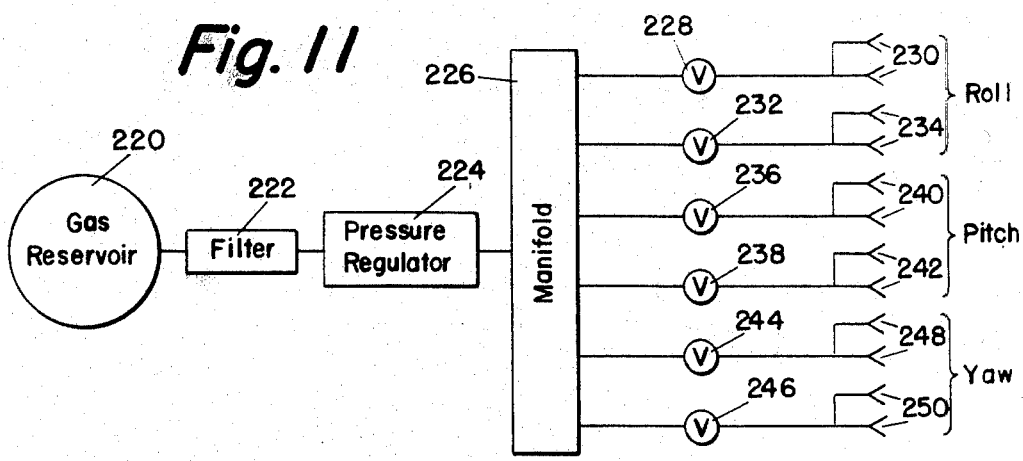
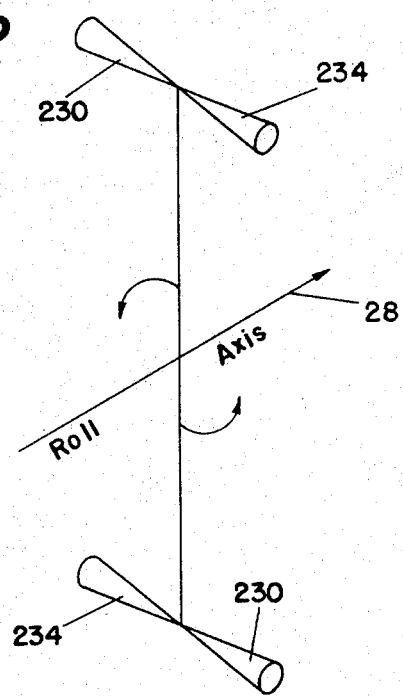
INVENTOR.
EMANUEL FTHENAKIS
BY
Edward W. Hughes
ATTORNEY United States Patent Office 3,472,468
Patented Oct. 14, 1969

3,472,468
ATTITUDE STABILIZER FOR SPACE VEHICLES
Emanuel Fthenakis, Strafford, Wayne, Pa., assignor to General Electric Company, a corporation of New York
Filed Oct. 28, 1959, Ser. No. 849,327
Int. Cl. B64c 17/00
U.S. Cl. 244—77                    7 Claims This invention relates to space vehicles, and more particularly to methods and apparatus for stabilizing space vehicles.

The term space vehicle as used herein is defined as being an apparatus or device designed normally to operate, for at least a limited period of time, at altitudes sufficiently far above the surface of the earth so that earth's atmosphere is negligible or can be considered to be nonexistent. However, the definition is broad enough to include any vehicle that is free to move above the surface of the earth.

It has only been within the last two years that space vehicles have been placed in orbit about the earth. It is clear that there are missions that can or soon will be accomplished from a space vehicle or with a space vehicle orbiting the earth, for example, that have not been done before. It is also clear that some missions that have been done before will be done significantly better by space vehicles. One of the new missions that will be accomplished for the first time through the use of space vehicles will be to observe, among other things, weather phenomena over most of the earth within a comparatively short time period. Space vehicles when used as communication relay points will make it possible to provide reliable communication between any two points of the globe by very high, or even higher, frequency radio links.

In order for a space vehicle to better perform these type missions and other type missions or functions than those listed above, it is highly desirable, if not absolutely necessary, to stabilize such vehicles about two of their three orthogonal axes; i.e., its pitch axis and its roll axis with the result that its third, or yaw axis will substantially coincide with the local vertical direction of the earth. This is true, of course, when a space vehicle is orbiting the earth. It is also true if a space vehicle orbits some other celestial body such as the moon or another planet.

Local vertical will be defined as the direction of a line from the center of a celestial body, such as the earth, and the center of gravity of the space vehicle. It naturally follows that if the yaw axis of the space vehicle coincides with local vertical, then the plane determined by the pitch and roll axes of a space vehicle will be parallel to the surface of the reference body, or the earth, at the point directly beneath the space vehicle. Thus, attitude stabilization of a space vehicle means orienting the vehicle so that one of its three arbitrarily assigned orthogonal axes, the yaw axis for example, coincides with the direction of local vertical of a reference body and the pitch and roll axes of the vehicle will determine a plane which will be substantially parallel to the surface of the reference body at a point directly below the space vehicle.

Certain advantages are derived from stabilizing a space vehicle with respect to a reference body so that its yaw axis, for example, coincides with the local vertical of a reference body. This is particularly true when it is desired to communicate between the space vehicle and a point or points on the surface of the earth. Where the space vehicle is stabilized in this manner, it will be possible to use directional antennae for both receiving and transmitting which will reduce the weight of the transmitter, receiver and their power supply. Similarly, when a space vehicle is used for reconnaissance purposes, it is more efficient to stabilize the vehicle so that photographic cameras, television cameras, etc., which are mounted in the vehicle will be pointing toward the earth. In a stabilized vehicle, it will not be necessary to provide special apparatus for each camera, photographic or television, to make certain they point toward the earth.

It is, threfore, an object of this invention to provide methods and apparatus for stabilizing a vehicle with respect to another body.

It is another object of this invention to provide method and apparatus for a space vehicle to cause an axis of the vehicle to substantially coincide with the direction of local vertical of a celestial body.

It is still another object of this invention to provide method and apparatus for stabilizing a space vehicle about its pitch and roll axes so that the plane determined by these axes will be substantially parallel to a point on the surface of a celestial body directly beneath the space vehicle.

It is still a further object of this invention to use the discontinuity in the intensity of radiation between a reference body and the sky, or space, to determine the attitude of the space vehicle with respect to the reference body and to use this information to stabilize the attitude of the vehicle with respect to the reference body.

Other objects and many of the attendant advantages of this invention will be readily appreciated as the same becomes better understood by reference to the following detailed description when considered in connection with the accompanying drawings wherein:

FIG. 3 is a block diagram of the means for stabilizing a space vehicle about one of its axes.

FIG. 6 is an isometric view illustrating in three dimensions the geometric relationship between a space vehicle, a scan pattern and a celestial object to stabilize the space vehicle.

FIG. 7 is an isometric view illustrating how two infrared scanners are mounted on a space vehicle.

FIG. 10 is a schematic diagram of a circuit of a trigger amplifier.

FIG. 11 is a schematic block diagram of pneumatic torque generators.

FIG. 12 is an isometric view illustrating the location of the nozzles to produce torques about a reference axis.

Figure 1:
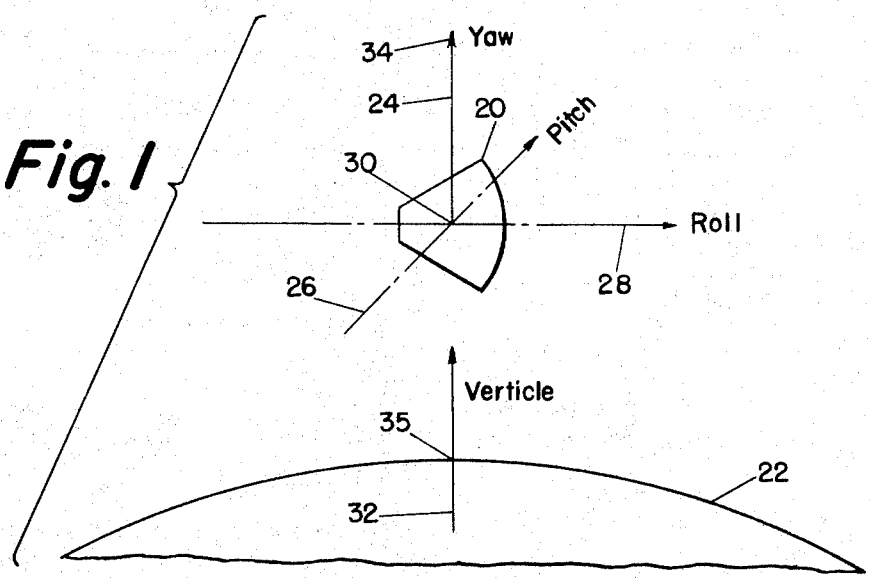
FIG. 1 is a schematic view of a space vehicle orbiting a celestial object; the size of the space vehicle is greatly exaggerated.

Referring now to FIG. 1, there is illustrated a space vehicle 20 which is moving with respect to celestial body 22, which may be the earth. Space vehicle 20 has a yaw axis 24, a pitch axis 26, and a roll axis 28 which are at right angles to one another and intersect at the center of gravity 30 of space vehicle 20. Local vertical, line 32, is determined by the center, or center of gravity, of earth 22 and the center of gravity 30 of vehicle 20. Space vehicle 20 will be considered to be stabilized with respect to earth 22 when its yaw axis 24 substantially coincides with the direction of local vertical at each and every point in its path above earth 22, and arrowhead 34 of yaw axis 24 points away from earth 22. At the moment space vehicle 20 is in the position illustrated in FIG. 1, and if it is stabilized with respect to the earth, then yaw axis 24 will coincide with line 32, and the pitch-roll plane, determined by pitch axis 26 and roll axis 28 will be parallel to the surface of the earth at point 35, the intersection of line 32 with the surface of earth 22.

The first step in solving the problem of stabilizing a space vehicle is to determine local vertical of the body with respect to which the space vehicle is to be stabilized. The discontinuity in the intensity of radiation from a celestial body such as the earth, the moon, the sun, etc., and that from the sky or space due to the differences in their temperatures at the boundary, or horizon between the earth and the sky, for example, provides a way to determine local vertical. This temperature discontinuity can be sensed, or detected, in several ways. One of the ways is by focusing by optical means, for example, radiation from the earth and sky on a thermal detector such as a thermistor, a lead sulphide infrared detector, etc.

For all practical purposes, it can be assumed that the earth is spherical and this assumption will be made with respect to any celestial body. When this is the case, then the horizon of such a body as observed from a space vehicle will determine a circle, hereafter referred to as the horizon circle. Local vertical at the space vehicle will intersect the center of the horizon circle. By substantially continuously locating the center of the horizon circle, it is possible to determine local vertical since the center of gravity of the space vehicle is known.

Figure 2:
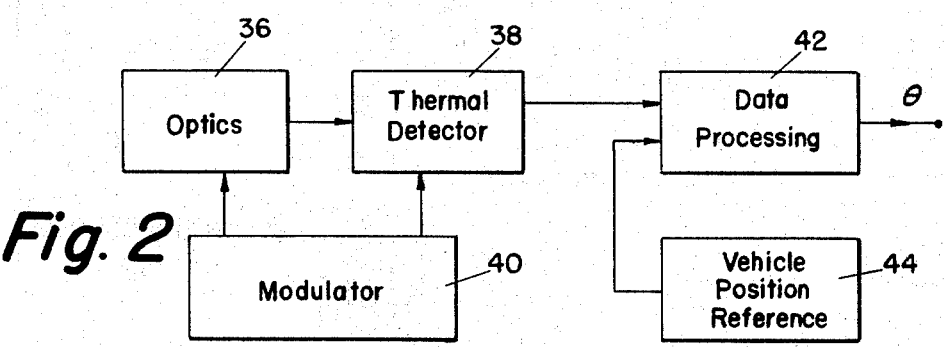
FIG. 2 is a block diagram of elements for sensing the temperature discontinuity between a celestial body and the sky, and for determining the attitude of a space vehicle with respect to the celestial object.

FIG. 2 is a schematic block diagram illustrating the broad functions to be performed by a stabilization system for a space vehicle which uses the discontinuity between radiation from the sky and that from a celestial body to determine the direction of local vertical, and then compares the attitude of the space vehicle with local vertical to produce an error signal. Some form of an optical device 36 is necessary to focus radiation from the earth and the sky on a thermal detector 38. In order to find the discontinuity or horizon, it is necessary to modulate the optics 36 or modulate thermal detector 38. Modulator 40 will cause scanning to occur by optical means or by electrical means. The connections between modulator 40 and optics 36 and thermal detector 38 symbolizes the fact that modulation can be performed either optically or electronically. Information produced by thermal detector 38 is supplied to data processing means 42 and information relative to the vehicle's position is supplied to means 42 from the vehicle position reference means 44. The data processing means 42 produces from this information an output signal which is a function of the deviation of the orientation of the space vehicle from a desired orientation with respect to the earth 22. This information in the form of an error signal can then be used to control a servomechanism to reorient the space vehicle so that it will have the desired attitude.

There are two ways of locating the center of a circle. One way of locating the center of the horizon circle is derived from the definition of a circle; i.e., find the point which is equidistant from the circumference. Another way is by determining the intersection of the perpendicular bisectors of two chords of the circle. The embodiment of the invention described and illustrated, in essence, locates the center of the horizon circle of a celestial body as observed from the space vehicle by the perpendicular bisector method. Referring to FIG. 6, when the roll-yaw plane of space vehicle 20, which is determined by roll axis 28 and yaw axis 24, intersects the horizon circle 43 of earth 22 and is a perpendicular bisector of the chord 45 of circle 43, then yaw axis 24 will coincide with local vertical as measured about roll axis 28. Similarly, when the pitch-yaw plane of space vehicle 20 is determined by pitch axis 26 and yaw axis 24 is likewise a perpendicular bisector of another chord of horizon circle 43 which is not illustrated, then yaw axis 24 will coincide with local vertical as measured about pitch axis 26, and yaw axis 24 will coincide with the direction of the local vertical 32 of earth 22.

One way of determining if the roll-yaw and pitch-yaw planes of space vehicle 20 orbiting celestial body 22 are perpendicular bisectors of chords of the horizon circle 43 is to provide optical means that will conduct a conical scan about the roll axis 28 and about the pitch axis 26 of space vehicle 20. The conical scan about roll axis 28, for example, is performed so that the axis about which the scan is conducted; i.e., the cone axis, coincides with the roll axis 28. If the angle $\alpha$ of the cone of the scan is sufficiently large (see FIG. 6) then the earth 22 will be scanned or intersected, at least once during each scan cycle, and during the rest of each scan cycle the sky will be scanned. The intersections of the scan circle 41 with the horizon circle 43 of the earth 22 determine chord 45. If the scan is conducted at a substantially constant angular rate, then the time, or phase, at which the earth is intersected or scanned during each scan cycle can be considered to represent the direction of the chord 45. The length of chord 45, when space vehicle 20 is stabilized and the scan angle $\alpha$ is constant, is a function of the height of space vehicle 20 above the surface of the earth.

FIG. 3 is a block diagram of the elements necessary to stabilize a space vehicle about one of its axes, either its pitch or roll axis. Infrared scanner 46 includes a thermal detector which produces a signal having a wave form whose amplitude depends upon whether the scanner is focused on the earth or the sky, or an earth-sky signal. The output signal of infrared scanner 46 is amplified by amplifier circuit 48 and is then applied through centering circuit 50 and amplifier 52 to phase detector 54. Scanner 46, amplifier 48, centering circuit 50, and amplifier 52 are specific embodiments of the more generalized optics 36, thermal detector 38, and modulator 40 of FIG. 2. Reference signal generator 56 of FIG. 3 corresponds to the vehicle position reference 44 of FIG. 2 and produces a pulse each time during a scan cycle that infrared scanner 46 intersects the roll-yaw plane of space vehicle 20, assuming that the infrared scanner 46 is conducting a scan about the roll axis 28. The output signals of the reference signal generator are also applied to phase detector 54 which corresponds to the data processing means 42 of FIG. 2. In phase detector 54, the signals from amplifier 52 and reference signal generator 56 are combined to produce an error voltage, $\theta$ which is a function of the deviation of the yaw axis 24 from local vertical direction 32, measured with respect to the roll axis 28. Error voltage $\theta$ is, in a preferred form of the invention, a DC voltage whose polarity is a function of the direction of the angular deviation and whose amplitude is a function of the magnitude of the deviation.

Control circuit or trigger amplifier 58 is used to control torque generators 60 to produce torques about roll axis 28 to reduce the error voltage $\theta$ substantially to zero and thus the deviation between local vertical 32 and the yaw axis 24 as measured about roll axis 28 substantially to zero. In order to damp out oscillation of yaw axis 24 with respect to local vertical, a rate signal $\dot{\theta}$ is also applied to control circuit 58. The rate signal $\dot{\theta}$ is produced by roll rate measuring device 62. In a preferred form of the invention, device 62 is a conventional rate gyro which is mounted in space vehcle 20 to measure the angular velocity of the space vehicle 20 about its roll axis 28. Rate measuring means 62, in a preferred form of the invention, produces a DC voltage whose polarity is a function of the direction of an angular velocity of space vehcle 20 about roll axis 28 and whose amplitude is a function of its magnitude.

In control circuit 58, the signals corresponding to $\theta$ and $\dot{\theta}$ are combined by summing circuit 64. The summed voltage is then applied to modulator 66 to produce an AC signal whose amplitude is proportional to the sum of $\theta$ and $\dot{\theta}$ and whose phase represents the polarity of the summed signals. The output of modulator 66 is amplified, differentiated, and clamped by the circuit 68 so that only pulses of the proper polarity are applied to blocking oscillator 70. When the pulses produced by circuit 68 exceed a certain predetermined amplitude, they cause blocking oscillator 70 to apply pulses to the phase detector 72. The phase of the pulses that cause blocking oscillator to produce pulses, with respect to a reference signal, causes either clockwise torquer 74 to produce a clockwise torque about axis 28, or counterclockwise torquer 76 to produce a counterclockwise torque about axis 28. Control circuit 58 is connected to torque generator 60 so that the direction of the torque produced is such as to reduce error signal θ to zero.

Figure 4:
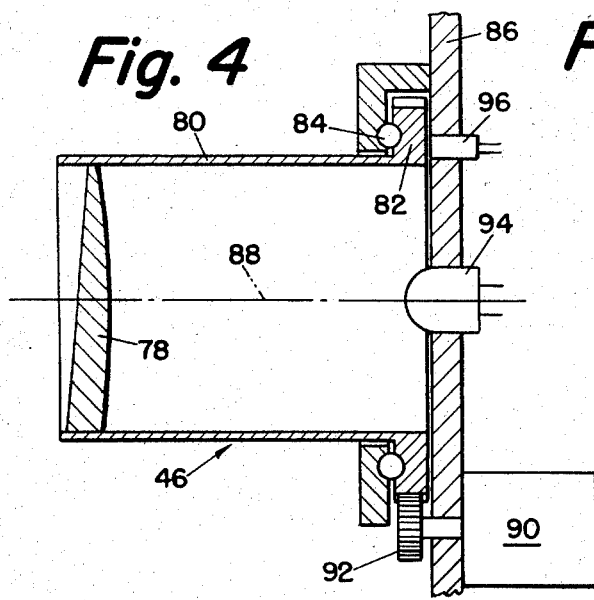
FIG. 4 is a sectional view of an infrared scanner.

FIG. 4 is a sectional view of scanner 46. A combined germanium lens and prism 78 is mounted in one end of hollow cylinder 80. Cylinder 80 is provided with a flange 82 which in cooperation with the bearings 84 permits cylinder 80 to be mounted on base 86 for rotation about longitudinal axis 88. Motor 90 which is mounted on base 86 drives cylinder 80 counterclockwise by means of a reduction gears 92 at an angular velocity, in a preferred form of the invention, of 30 revolutions per second. Incident long wave infrared radiation that passes through the prism and lens 78 is focused on a germanium immersed thermistor 94.

Germanium is an ideal optical material for long wave length infrared radiation having a wave length of from 7 to 14 microns, peaking at 9.5 microns, which has proven to be the most satisfactory range, not only because of its transmission characteristics, but also because of its high index of refraction (4.0) and low dispersion. A very fast lens can be made without excessive curvature, and a large deviation can be produced by a small prism angle. In a preferred example, a 2 cm. dia. *f*/1.0 lens is used. A prism angle of 12° gives a 45° displacement of the field of view. When prism 78 is rotated, it produces a 90° conical scan.

Figure 5:
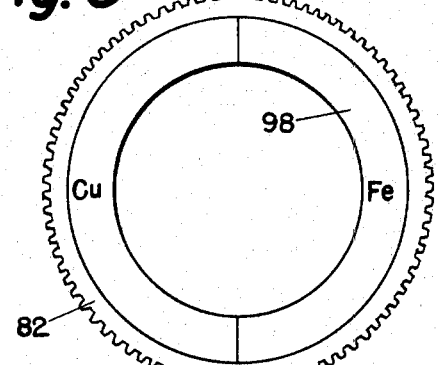
FIG. 5 is a plan view of part of a reference signal generator.

Reference signal generator 56 comprises a magnetic pickup unit 96 which in conjunction with the flange 82 of cylinder 80 produces timing pulses. The surface of flange 82 (see FIG. 5) nearest the base 86 has a semi-circular vane 98 of magnetic material such as soft iron adjustably mounted on it. Flange 82 is made of a nonmagnetic material such as copper, or aluminum. As cylinder 80 rotates, the magnetic flux through the magnetic pickup unit 96 will change at the transition between copper and iron to induce voltage pulses. Vane 98 is located so that the phase of the pulses produced will represent the yaw-roll plane of space vehicle 20, or correspond to the direction of yaw axis 24 of space vehicle 20.

The type of scan that an infrared sensor mounted on space vehicle 20 would conduct around the roll axis 28 is illustrated in FIG. 6. In a preferred example, the cone angle α was chosen as 45° to increase the probability of intersecting or seeing the earth 22 during each scan. The exact cone angle chosen depends on apogee and perigee of the orbit of the space vehicle in which the sensors are mounted and the diameter of the reference body. The size of the thermal detector on which the incident radiation is focused and the optical characteristics of the lens and prism result in the field of view being approximately 1° x 4° in a preferred example.

FIG. 7 illustrates how a pair of infrared scanners 46, 100 are located with respect to yaw axis 24, pitch axis 26, and roll axis 28 of a space vehicle 20. With two infrared sensors located as illustrated in FIG. 6, each being associated with a group of elements as outlined in FIG. 3, it is possible to stabilize space vehicle 20 with respect to the local vertical of a celestial body.

Figure 8:
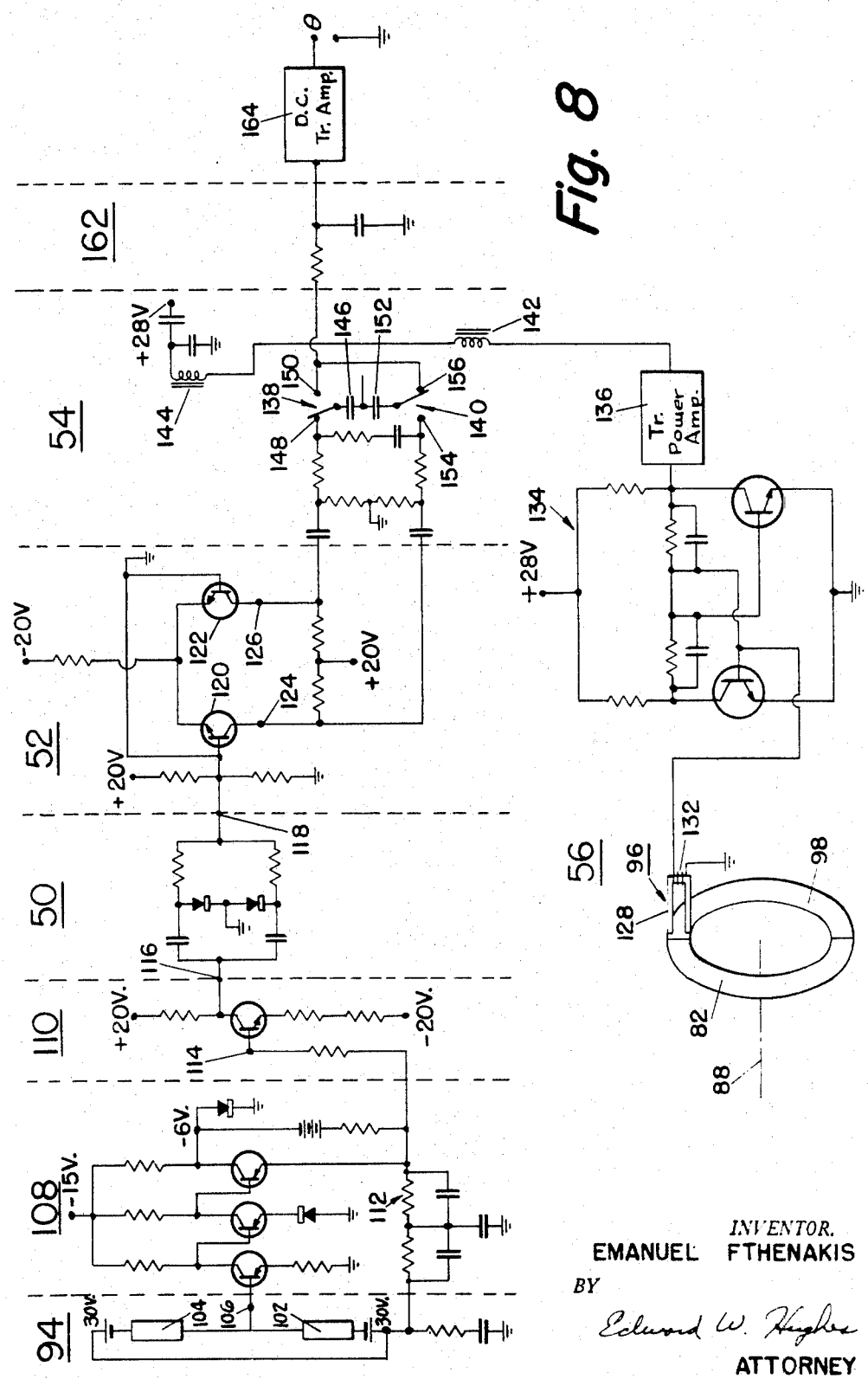
FIG. 8 is a schematic diagram of a circuit for generating an error signal which is proportional to the change in attitude of a space vehicle about one of its axes.

A preferred embodiment of the electronic circuitry used to produce an error signal θ is illustrated in FIG. 8. Incident electromagnetic radiation from the earth or the sky is focused on receiver flake 102 of thermal detector 94 of infrared sensor 46. The resistance of receiver flake 102, which is a thermistor bolometer in a preferred example, is an inverse function of the total amount or intensity of a radiant energy focused on it. Compensator flake 104 which has substantially the same size, shape, and composition as receiver flake 102 prevents any changes in the output signal from being caused by changes in the ambient temperature of themistor 94.

Figure 9A:
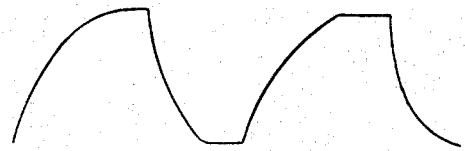
FIGS. 9A to 9L are plots of wave forms at various points of the circuit of FIG. 8.
Figure 9B:
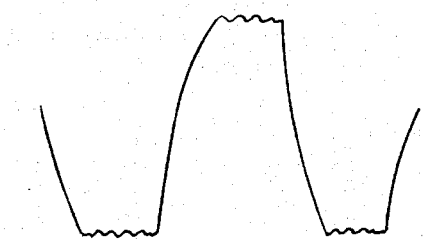
Figure 9C:
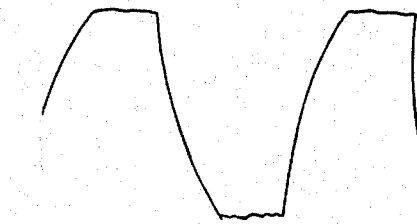

FIG. 9a is a wave form such as could be produced at output terminal 106 of thermistor 94. When radiation from the sky is focused on receiver flake 102, its resistance is relatively high, causing the output signal, the sky signal, to be relatively high. When radiation from the earth is focused on flake 102 its resistance will decrease, so that the potential drop across it is relatively less, causing the output signal, the earth signal, to be relatively low. The output signal of thermistor 94 at terminal 106, the earth-sky signal, is applied to amplifier 48 which is comprised of a three stage transistor preamplifier 108 and a booster amplifier 110. Preamplifier 108 is a three stage direct coupled transistor amplifier with a feedback circuit 112 to improve its frequency response characteristics. The wave form illustrated in FIG. 9b is typical of that which is produced by the preamplifier 108. The output signal of preamplifier 108 is applied to the input terminal 114 of booster amplifier 110. Wave form 9c is typical of the wave form produced by booster amplifier 110 which is applied to the input terminal 116 of signal centering circuit 50.

Figure 9D:
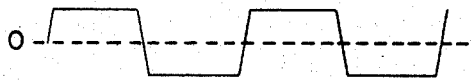
Figure 9E:
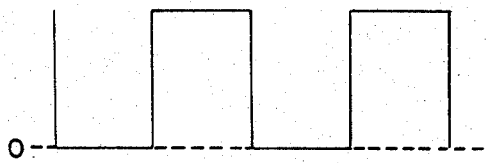
Figure 9F:
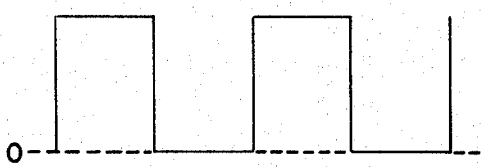

Signal centering circuit 50 is so designed that its output voltage as illustrated in FIG. 9d will be symmetric about a given voltage level, ground in a preferred example, which is independent of the duty cycle of the applied wave form. Signal centering circuit 50 is in essence a double clamping circuit which samples a thin horizontal slice of the wave form applied to it. This reduces to a minimum the magnitude of the phase delays due to the finite rise and fall times of the signals produced by infrared sensor 46. FIG. 9d is an example of a typical wave form produced by signal centering circuit 50. The output of circuit 50 is then applied to amplifier circuit 52 which is a emitter coupled multivibrator. When the signal applied to the input terminal 118 of amplifier circuit 52 goes positive, transistor 120 will conduct and transistor 122 will be cut off. When transistor 120 is cut off by a negative input signal, then transistor 122 will conduct. The signals at the collector 124 of trasistor 120 and collector 126 of transistor 122 will be substantially rectangular waves, 180° out of phase as illustrated in FIGS. 9e and 9f. These signals are then capacitively coupled to mechanical phase detector 54.

Figure 9G:
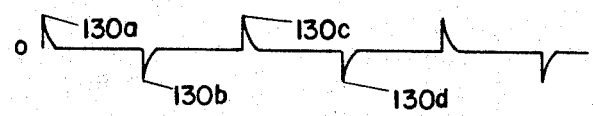

Some of the more important elements of reference signal generator 44 are illustrated in FIG. 8. As flange 82 rotates about axis of rotation 88, the magnetic flux through permanent magnet 128 of pickup unit 96 varies, depending upon whether its magnetic circuit is completed through iron vane 98 or through the nonmagnetic material from which flange 82 is made. Changes in the magnitude of the magnetic flux induce trigger pulses 130, such as are illustrated in FIG. 9g, in coil 132 which is placed around magnet 128. Trigger pulses 130 are applied to conventional transistor multivibrator 134, which produces square pulses in synchronism with trigger pulses 130. The output signal of multivibrator 134 is amplifier by a conventional transistor power amplifier 136 to control solenoid operated high speed switches 138 and 140. The output signal of amplifier 136 energizes solenoid 142 of switch 140 and solenoid 144 of switch 138. During one half of each scanning cycle, switch 138 connects capacitor 146 to terminal 148, and then during the other half cycle connects capacitor 146 to terminal 150. Similarly, switch 140 connects capacitor 152 to terminal 154 for half of each a scanning cycle and then connects it to terminal 156 for the other half of each cycle. Switches 138 and 140 operate in opposite phase, or push-pull, so that when capacitor 146 is connected to terminal 148, for example, capacitor 152 is connected to terminal 156.

Figure 9H:
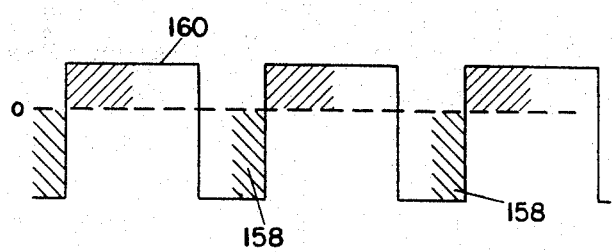
Figure 9I:
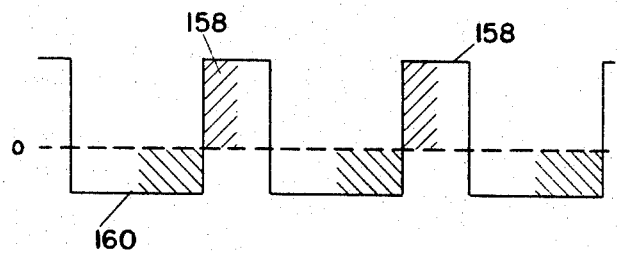

In FIGS. 9h and 9i, the wave forms of the voltages at terminals 148, 154 are illustrated. In these figures, the duty cycle is 2:1. In FIGS. 9a through 9f, the duty cycle was arbitrarily assumed to be 1:1. In FIGS. 9h and 9i, narrow portion 158 of the wave forms is the earth signal since it is the result of radiation from the earth which is focused on thermistor 94 of the infrared scanner 46 during each conical scan. For the same reason, the wider portion 160 is the sky signal. Since terminals 148, 154 are connected by capacitors to the collectors 124, 126 of amplifier 52, their average potential will be zero. This value is represented by the horizontal dashed lines in FIGS. 9h and 9i. If capacitor 146 is connected to terminal 148 during the half scanning cycle between trigger pulses 130a, 130b, the shaded area between the wave form and dashed line in FIG. 9h represents the amount of charge subtracted from and then added to capacitor 146. The areas above and below ground are equal when the trigger pulse occurs in the center of the sky and earth signals; therefore, the net charge on capacitor 146 under these circumstances will be zero. No net potential will be applied to integrating circuit 162 when capacitor 146 is connected to terminal 150 during the time between pulses 130b, 130c. During the half cycle between trigger pulses 130b and 130c, capacitor 152 will be connected to terminal 154; no net charge will be accumulated on capacitor 152 and no potential will be applied to integrating circuit 162 during the period between pulses 130c, 130d when capacitor 152 is connected to terminal 156. Thus, the output voltage of DC amplifier 162 will be zero when trigger pulses 130 occur in the center of the earth signal and the sky signal, irrespective of the duty cycle.

Figure 9J:
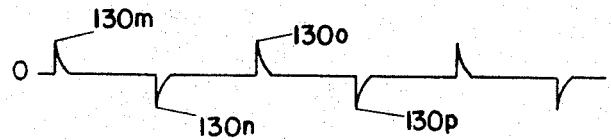
Figure 9K:
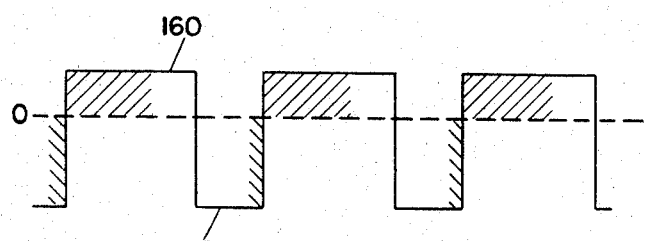
Figure 9L:
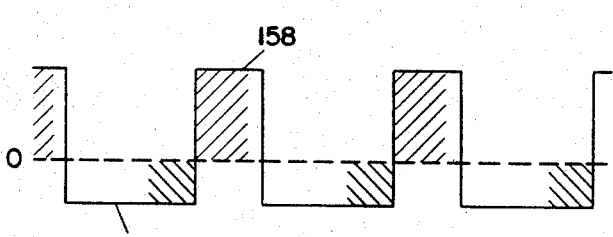

In FIGS. 9j, 9k, and 9l, trigger pulses 130m, 130n, 130o, and 130p do not occur in the center of the earth signal 158 and sky signal 160. Their displacement represents a phase shift of approximately 30° in a clockwise direction, or an angular deviation between the yaw axis 24 and local vertical direction 34 of 30°. The shaded area between the wave form and the dashed line representing the average value in FIG. 9k represents the negative and positive charges added to capacitor 146, for example, during the half scanner cycle between pulses 130m, 130n. In this example, a net positive charge is accumulated on capacitor 146 so that a positive voltage will be applied to integrator circuit 162 and a positive DC voltage will be produced by amplifier 164 during the half scan cycle between pulses 130n and 130o when capacitor 146 is connected to integrating circuit 162. An equal net positive charge will also build up on capacitor 152 during the next half scan cycle which will be applied to integrating circuit 162 during the time between pulses 130o, 130p. Thus, the magnitude of error voltage θ depends on phase shift, and not the duty cycle or widths of the earth and sky pulses.

Integrating circuit 162 prevents minor fluctuations in the voltage supplied to amplifier 164. The gain of amplifier 164 is adjusted, in a preferred example, so that a 1 volt output voltage represents an angular deviation of 1°. When the phase shift is opposite to that illustrated in FIGS. 9j, 9k, 9l, it is believed to be obvious that equal net negative voltages will be built up on capacitors 146, 152 and a negative error signal θ will be produced by amplifier 164. From the foregoing, it is clear that under the circumstances as described and illustrated a positive θ, or error voltage, represents a clockise deviation of yaw axis 24 from local vertical 34 measured about roll axis 28, and a negative θ represents a counterclockwise deviation.

Occasionally, radiation from the sun will be focused on thermistor 94. However, since the signal applied to phase detector 54 is limited by centering circuit 50, the sun will merely appear as an additional half degree of "warm" area. When the sun is scanned, it will produce an error ranging from 0° to 5°, depending on its position. Fortunately, the occasions when the sun is scanned are infrequent and of short duration and do not constitute a significant problem.

In FIG. 10, control, or trigger, circuit 58 which regulates and controls the torquers 74, 76 is illustrated. The error signal θ, representing the angular deviation of the yaw axis 24 from the local vertical measured about the roll axis of the vehicle, is applied to input terminal 166. The angular rate signal θ is applied to input terminal 168. These signals are combined in resistor mixer network 170. Transistor oscillator 172 produces, in a preferred form, 400 cycles AC square waves. The 400 cycle signals are inductively coupled to the bases of transistors 174 and 176. From the collectors of transistors 174 and 176, there are derived 400 cycle square waves of opposite phase. The signals from transistor 174 are applied to conventional ring modulator 178 where the signal from mixer circuit 170 amplitude modulates the 400 cycle signal from transistor 174. The phase of the 400 cycle is determined by the polarity of the signals produced by mixer network 170. The signals produced by signal ring modulator 178 are then amplified by the circuit including transistor 180 and are AC coupled to a second transistor amplifying circuit including transistor 182 where the signals are peaked and clipped to eliminate positive pulses. If the negative pulses applied to the B₂ terminal of unijunction transistor 184 exceed a predetermined value, unijunction transistor 184 will conduct and cause capacitor 186 to discharge through the primary windings of transformers 188, 190. In a preferred embodiment, transistor 184 is a type 2N491, which is manufactured by the General Electric Company.

The secondary winding 192 of transformer 188 is connected to apply voltage pulses of the correct polarity to gate electrode 194 of silicon control rectifier 196, hereafter referred to as SCR 196, for example. The secondary winding 198 of transformer 190 also is connected to apply a voltage pulse of the same polarity to gate electrode 200 of SCR 202. The anodes of SCR's 196, 204 are connected in parallel to the collector of transistor 174, and the anodes of SCR's 202, 206 are connected in parallel to the collector of transistor 176.

Whenever the output voltage of mixer network 170 exceeds a certain magnitude, corresponding to an error of 1° or more, for example, then the amplitude of the pulses applied to the base B₂ of unijunction transistor 184 will be of sufficient amplitude to cause it to conduct. A pulse will then be applied through the action of transformers 188 and 190 to the gate electrodes of SCR's 196, 202. The anode of either SCR 196 or SCR 202 will be positive. The SCR whose anode is positive at the time a pulse is applied to its gate electrode will conduct. Whether SCR 196 or SCR 202 conducts depends on the phase of the pulses produced by modulator 178 which causes unijunction transistor 184 to conduct, which in turn depends on the polarity of the voltage produced by mixer network 170 which in turn depends primarily upon the polarity of the error voltage θ, or the deviation from local vertical of the yaw axis 24 measured about the roll axis 28. Silicon control rectifiers 196, 202, 204, 206 are, in a preferred example, type J39A-75's which are manufactured by the General Electric Company.

If SCR 202 conducts, then current will flow through solenoid 208 for 1/800 of a second; i.e., ½ of the period of a 400 cycle signal. The back E.M.F. across solenoid 208 causes a charge to accumulate on capacitor 210 sufficient to raise its potential to the value which will cause SCR 204 to conduct when its anode goes positive. This will occur at the same time that SCR 202 is cut off due to its anode's potential going to ground. In this way, solenoid 208 will be continuously energized for one cycle if unijunction transistor 184 conducts in phase with the energization of the anode of SCR 202. If the phase of the pulses which are applied to the terminal B₂ of unijunction transistor 184 having the necessary magnitude are opposite to that as described above, then SCR 196 will conduct to energize the solenoid 212. As long as unijunction transistor 184 conducts once during each cycle of the 400 cycle reference signal, then either solenoid 208 or 212 will be continuously energized.

As was pointed out above, an error signal $\theta$ which has a positive polarity will represent a clockwise deviation of yaw axis 24 from local vertical about roll axis 28, and if its polarity is negative, it represents a counterclockwise deviation. Thus, solenoid 208, if energized when $\theta$ is positive, will cause the counterclockwise torquer 76 to be energized to develop a counterclockwise torque to reduce the magnitude of the deviation between the yaw axis and local vertical. If $\theta$ is negative and of a sufficient magnitude, then solenoid 212 will be energized to produce a clockwise torque to similarly reduce the magnitude of the deviation.

FIG. 11 is a schematic diagram of a pneumatic system for producing torques about the three axes of a space vehicle. In a preferred form, a gas, such as nitrogen, is stored in reservoir 220 at a very high pressure. Gas from reservoir 220 flows through a filter 222 to remove any solid material that might be entrained with it, and through pressure regulator valve 224 into a manifold 226. Pressure regulator 224 maintains the pressure of the gas within the manifold 226 at a substantially constant pressure of 200 pounds per square inch, for example. Clockwise torquer 74 consists of a solenoid operated valve 228 and a pair of nozzles 230, and counterclockwise torquer 76 consists of a solenoid operated valve 232 and a pair of nozzles 234. Solenoid 208 when energized opens valve 232 and solenoid 212 when energized opens valve 228. The nozzles 230, 234 are mounted as illustrated schematically in FIG. 12. If solenoid 208 is energized, then valve 232 will open and gas from manifold 226 will escape through nozzles 234 to produce a counterclockwise torque about the roll axis 28 of space vehicle 20. If solenoid 212 is energized, then valve 228 is operated, gas will escape through nozzles 230 to produce a clockwise torque about roll axis 28. In a similar manner, the solenoid valve 236, 238 could be used to control the flow of gas through nozzles 240, 242 to produce torques about the pitch axis 26 of space vehicle 20; and solenoid valve 244, 246 could be used to control gas flow through nozzles 248, 250 to produce torques about the yaw axis 24 of space vehicle 20.

The system illustrated in FIG. 3 is capable of stabilizing space vehicle 20 about one of its coordinate axes such as roll axis 28 as described above. A duplicate or parallel system mounted in the same manner about the pitch axis 26 of space vehicle 20 and operating in the same manner can be used to control the attitude of the space vehicle 20 about its pitch axis 26. When the error signals produced by the phase detectors of the pitch and roll attitude control means are substantially zero, then yaw axis 24 will be substantially aligned with the local vertical direction of the reference body.

In describing the operation of the attitude control means, the statement has been made that the yaw axis 24 will be aligned with the local vertical direction. There is, however, conceivably the possibility of an ambiguity, depending upon whether the yaw axis vector of the space vehicle, for example, points upwardly or downwardly. This would be somewhat embarrassing if all the equipment for observing the earth would be pointing away from the earth. This cannot occur, however. When the yaw axis of space vehicle 20 in FIG. 2 is directed away from the surface of the earth we have defined that when the error signal $\theta$ is positive, the deviation is clockwise; and when it is negative, the deviation is counterclockwise. A positive signal will then cause a counterclockwise torque to be generated about the roll axis and a negative signal will cause a clockwise torque to be produced.

If the space vehicle were inverted so that the arrowhead 34 of yaw axis 24 was pointed toward the surface of the earth, it is inherent in the geometry of this relation that a counterclockwise deviation will produce a positive error signal which will produce a torque which will initially increase the deviation rather than decrease it. If the space vehicle were initially oriented so that its yaw axis pointed toward the surface of the earth rather than away from it, any deviation from vertical will produce torques to increase the deviation until the yaw vector is pointing away from the earth. In other words, as long as the space vehicle is inverted, the attitude control circuit is unstable.

The method and apparatus described and illustrated are for stabilizing a space vehicle with respect to any two of its axes. In order to obtain stability about the third axis, it is necessary to sense or measure the attitude of the vehicle about its yaw axis 24 with respect to some references. Several systems have been used. A relatively simple one relies on the magnetic field of the earth, for example, and is used so that the vehicle has a constant heading with respect to the magnetic field of the earth. In such a system, an error signal corresponding to $\theta$ produced by phase detector 54 in FIG. 3 could be produced by a magnetic induction compass. This signal can then be combined with a rate signal measured about the yaw axis, which would be applied to a control circuit such as trigger amplifier 58 to control the production of torques about the yaw axis. Similarly, it is possible to stabilize a space vehicle about its yaw axis with respect to a reference body such as a star, through the use of a star tracker, or with respect to the sun by similar means.

The values of rate signal $\dot{\theta}$ are chosen to limit the maximum angular velocity. In a preferred example, the maximum angular velocity about any axis was chosen as 2 degrees per second. When the angular velocity reaches this value, the rate signal produced by the rate measuring means 62 will cancel out the error signal $\theta$. The amount of thrust produced by the torquers is so designed, taking into consideration the moment of inertia of the space vehicle, that over a reasonable period of time, oscillations within a dead band of 2° will be reduced substantially to zero. Obviously, other means that pressurized gas can be used to produce stabilizing torques. The thrust can be produced by solid, or liquid propellants, or by ion propulsion motors, for example.

What is claimed is:

1. Means for stabilizing with respect to the earth a space vehicle having a yaw axis, a roll axis, and a pitch axis, comprising a roll infrared scanner including optical means and a thermal detector to conduct a conical scan about the roll axis, said infrared scanner producing an earth signal when the scanner scans the earth and a sky signal when it scans the sky, a roll reference signal generator, said roll reference generator producing reference signals at the time radiation from sources in the plane determined by the yaw and the roll axes is focused on the thermal detector of the infrared scanner, a roll phase detector to which signals derived from the earth-sky signals from the infrared scanner are applied and to which is also applied the signal derived from the roll reference generator, said detector producing a roll error signal which is a function of the direction and magnitude of the deviation of the yaw axis from the local vertical of the earth as measured about the roll axis of the vehicle, rate means for producing a roll rate error signal which is a function of the angular velocity of the space vehicle about said roll axis, roll thrust producing means mounted on said vehicle for producing torques about the roll axis, and roll control means to which the roll and roll rate error signals are applied for controlling the roll thrust producing means to produce a clockwise torque or counterclockwise torque about the roll axis so as to cause the yaw axis to substantially coincide with the local vertical of the reference body; a pitch infrared scanner including optical means and a thermal detector mounted to conduct a conical scan about the pitch axis, the pitch infrared scanner producing an earth signal when the signal scans the earth and a sky signal when it scans the sky, a pitch reference signal generator, said pitch reference genererator producing reference signals at the time radiation from sources in the plane of the pitch-yaw axes of the space vehicle is focused on the thermal detector of the pitch infrared scanner, a pitch phase detector to which signals derived from the earth-sky signal from the infrared scanner are applied and to which are also applied signals derived from the pitch reference generator, said pitch detector producing a pitch error signal which is a function of the direction and magnitude of the deviation of the yaw axis from the direction of local vertical as measured about the pitch axis, pitch rate means for producing a pitch rate error signal which is a function of the angular velocity of the space vehicle about its pitch axis, pitch thrust producing means mounted on the vehicle for producing torques about the pitch axis, and pitch control means to which the pitch and pitch rate error signals are applied for controlling the pitch thrust producing means to produce a clockwise torque or counterclockwise torque about the pitch axis so as to cause the yaw axis to substantially coincide with local vertical.

2. In combination with a space vehicle, means for stabilizing a space vehicle having a yaw axis, a roll axis, and a pitch axis with respect to the earth, comprising a roll infrared sensor mounted on the space vehicle to conduct a conical scan about said roll axis, said sensor producing a signal having one amplitude when the sensor scans the earth and a different amplitude when the sensor scans the sky, a roll reference generator which produces reference pulses at the time during each conical scan that the scan intersects the plane determined by the yaw and the roll axes, a roll phase detector to which the signals derived from the roll infrared sensor are applied, and to which are also applied signals derived from the reference generator, said roll phase detector producing a roll error signal whose polarity and magnitude are functions of the direction and magnitude of the deviation of the yaw axis from the local vertical of the earth as measured about the roll axis of the vehicle, roll rate means for producing a roll rate error signal proportional to the angular velocity of the space vehicle about its roll axis, means for producing torques about the roll axis, and roll control means to which the roll error and roll rate error signals are applied for controlling the means for producing torques to produce a clockwise torque or counterclockwise torque about the roll axis so as to cause the roll error signal to become substantially zero at which point the yaw axis will coincide with the local vertical of the reference body, a pitch infrared sensor mounted on the space vehicle to conduct a conical scan about the pitch axis, said pitch sensor producing a signal having one amplitude when the sensor scans the earth and a different amplitude when the sensor scans the sky, a pitch reference generator which produces reference pulses at the time during each scan that the pitch scanner intersects the plane determined by the pitch and yaw axes, a pitch phase detector to which the signals derived from the pitch infrared sensor are applied and to which are also applied signals derived from the pitch reference generator, said pitch phase detector producing a pitch error signal whose polarity and magnitude are functions of the directions and magnitude of the deviation of the yaw axis from local vertical as measured about the pitch axis, pitch rate means for producing a pitch rate error signal proportional to the angular velocity of a space vehicle about its pitch axis, means for producing torques about the pitch axis, and pitch control means to which the pitch error and pitch rate error signals are applied for controlling the means for producing torques to produce a clockwise torque or a counterclockwise torque about the pitch axis so as to cause the pitch error signal to become substantially zero at which point the yaw axis will coincide with the local vertical.

3. Means for stabilizing a space vehicle with respect to a celestial body so that an arbitrary reference axis of said vehicle substantially and continously coincides with the direction of local vertical of the celestial body, comprising first means mounted on said vehicle for conducting a substantially conical scan of a field of view about a first cone axis, said first cone axis having a pre-determined relationship to said reference axis, first detector means onto which said first means directs radiation from the field of view scanned for producing a first signal which is a function of the radiant energy incident upon it, a first reference signal generator for producing a first reference signal, and means to which signals from the first detector and the first reference signal generator are applied and responsive to said signals for orienting the space vehicle so that the reference axis substantially lies in a first plane in which local vertical lies; second means mounted on said vehicle for conducting a substantially conical scan of a field of view about a second cone axis which has a pre-determined relationship with said reference axis of said vehicle differing from the relationship of the first cone axis to said reference axis, second detector means onto which said second means directs radiation originating in the scanned field of view for producing a signal which is a function of the radiant energy incident upon it, a second reference signal generator for producing a second reference signal, and means to which signals from the second detector and the second reference generator are applied and responsive to said signals for orienting the space vehicle so that its reference axis substantially lies in a second plane in which local vertical lies.

4. Means for stabilizing a space vehicle with respect to a celestial body so that an arbitrary reference axis of said vehicle substantially and continuously coincides with the direction of local vertical of the celestial body, comprising first optical means mounted on said vehicle for scanning a field of view of limited angular dimensions about a first cone axis, said first cone axis having a pre-determined relationship to said reference axis, first thermal detector means onto which said first optical means directs radiation from the field of view scanned for producing a first signal which is a function of the radiant energy incident upon it, a first reference signal generator for producing a first reference signal, first circuit means to which the signal from the first detector and the first reference signal generator are applied for producing a first error signal which is a function of the deviation of said reference axis from local vertical as measured about the first cone axis, and means responsive to the first error signal for orienting the space vehicle to minimize said first error signal; second optical means mounted on said vehicle for scanning a second field of view of limited angular dimensions about a second cone axis which has a predetermined relationship with said reference axis of said vehicle differing from the relationship of the first cone axis, second thermal detector means onto which said second optical means directs radiation originating in the scanned field of view for producing a signal which is a function of the radiant energy incident upon it, a second reference signal generator for producing a reference signal, circuit means to which the signals from the second detector means and the second reference signal generator are applied for producing a second error signal which is a function of the deviation of said reference axis from local vertical as measured about the second cone axis, and means responsive to the second error signal for orienting the space vehicle to minimize said second error signal.

5. Means for stabilizing a space vehicle having a yaw axis, a roll axis, and a pitch axis with respect to a celestial body comprising roll scanning means, roll detecting means for producing a signal which is a function of the radiant energy incident upon it, said roll scanning means being mounted on the vehicle for conducting a conical scan substantially about the vehicle's roll axis, at a substantially constant angular velocity, the cone angle of the scan being constant, said roll scanning means directing on the roll detecting means radiant energy from the scanned field of view, a roll reference generator for producing roll reference signals, roll data processing means to which the signals from the roll detector and the roll reference generator are applied for producing a roll error signal, means for producing torques about the roll axis, and roll control means to which the roll error signal is applied for controlling the means for producing torques about the roll axis so that the yaw axis of the vehicle will substantially lie in the plane determined by the roll axis of the vehicle and the center of said celestial body, pitch scanning means, pitch detecting means for producing a signal which is a function of the radiant energy incident upon it, said pitch scanning means being mounted on the vehicle to conduct a conical scan substantially about the vehicle's pitch axis at a substantially constant angular velocity, the cone angle of the scan being constant, said pitch scanning means directing on the pitch detecting means radiant energy from the scanned field of view, a pitch reference generator for producing pitch reference signals, pitch data processing means to which the signal from the pitch detector and the pitch reference signal generator are applied for producing a pitch error signal, means for producing torques about the pitch axis, and pitch roll control means to which the pitch error signal is applied for controlling the means for producing torques about the pitch axis so that the yaw axis of the vehicle will substantially lie in the plane determined by the pitch axis of the vehicle and the center of said celestial body, whereby the yaw axis of the vehicle substantially coincides with the direction of local vertical of the celestial body.

6. Means for stabilizing a space vehicle having a yaw axis, a roll axis, and a pitch axis with respect to a celestial body comprising roll scanning means, roll detecting means for producing a signal which is a function of the radiant energy incident upon it, said roll scanning means being mounted on the vehicle to conduct a conical scan substantially about the vehicle's roll axis, said scanning means focusing on the roll detecting means at any given time radiant energy from an area of limited angular dimensions in the scanned field of view, a roll reference generator for producing roll reference signals, roll data processing means to which the signals from the roll detecting means and the roll reference generator are applied for producing a roll error signal, means for producing torques about the roll axis, and control means to which the roll error signal is applied for controlling the means for producing torques about the roll axis so that the yaw axis of the vehicle will substantially be in the plane determined by the roll axis of the vehicle and the center of said celestial body, scanning means including pitch detecting means for producing a signal which is a function of the radiant energy incident upon it, said pitch scanning means being mounted on the vehicle to conduct a conical scan substantially about the vehicle's pitch axis, said pitch scanning means focusing on the pitch detecting means at any given time radiant energy from an area of limited angular dimensions in the scanned field of view, a pitch reference generator for producing pitch reference signals, pitch data processing means to which the signal from the pitch detector and the pitch reference signal generator are applied for producing a pitch error signal, means for producing torques about said pitch axis and pitch roll control means to which the pitch error signal is applied for controlling the means for producing torques about the pitch axis so that the yaw axis of the vehicle will substantially be in the plane determined by the pitch axis of the vehicle and the center of said celestial body, whereby the yaw axis of the vehicle substantially coincides with the direction of local vertical of said celestial body.

7. Means for stabilizing a space vehicle having a yaw axis, a roll axis, and a pitch axis with respect to a celestial body comprising roll scanning means, roll detecting means for producing signals which are a function of the infrared radiation incident upon it, said roll scanning means being mounted on the vehicle to conduct a conical scan substantially about the vehicle's roll axis, said scanning means focusing on the roll detecting means infrared radiant energy from sources within an area of limited angular dimensions in the field of view scanned, a roll reference generator for producing reference signals, data processing means to which the signals from the roll detector and the roll reference generator are applied for producing a roll error signal, roll torque poducing means, and roll control means to which the roll error signal is applied for controlling the roll torque producing means so that the center of the celestial body substantially lies in the roll-yaw plane; pitch scanning means including pitch detecting means for producing signals which are a function of the infrared radiation incident upon it, said pitch scanning means being mounted on the vehicle to conduct a conical scan substantially about the vehicle's pitch axis, said pitch scanning means focusing on the pitch detecting means infrared radiant energy from sources within an area of limited angular dimensions in the field of view scanned, a pitch reference generator for producing reference signals, second data processing means to which the signals from the pitch detector and the pitch reference signal generator are applied for producing a pitch error signal, pitch torque producing means, and pitch roll control means to which the pitch error signal is applied for controlling the pitch torque producing means to cause the center of the celestial body to substantially lie in the pitch-yaw plane whereby the yaw axis of the vehicle substantially coincides with the direction of local vertical of said celestial body.

References Cited

UNITED STATES PATENTS

| | | | |
|---|---|---|---|
| 2,740,961 | 4/1956 | Slater | 343—7 |
| 2,828,930 | 4/1958 | Herbold | 244—77 |
| 2,973,162 | 2/1961 | Haeussermann. | |
| 2,963,243 | 12/1960 | Rothe | 244—14 |
| 2,949,536 | 8/1960 | Langton. | |
| 2,825,021 | 2/1958 | Friend. | |

OTHER REFERENCES

Vistas in Astronautics (TL–787–V5), 1958; Pergamon Press, New York.

VERLIN R. PENDEGRASS, Primary Examiner